United States Patent [19]

Kubota

[11] 4,143,405
[45] Mar. 6, 1979

[54] AUTOMATIC HEAD SCAN TRACKING SYSTEM

[75] Inventor: Yukio Kubota, Tokyo, Japan

[73] Assignee: Sony Corporation, Tokyo, Japan

[21] Appl. No.: 838,375

[22] Filed: Sep. 30, 1977

[30] Foreign Application Priority Data

Oct. 5, 1976 [JP] Japan .................................. 51-120114
Oct. 7, 1976 [JP] Japan .................................. 51-120657

[51] Int. Cl.² ...................... G11B 21/10; G11B 21/18; H04N 5/78
[52] U.S. Cl. ........................................ 360/10; 360/70; 360/77
[58] Field of Search .................. 360/9, 10, 70, 75, 76, 360/77, 107, 84, 109

[56] References Cited

U.S. PATENT DOCUMENTS

| 3,375,331 | 3/1968 | Okazaki et al. | 360/107 X |
| 3,526,726 | 9/1970 | Corbett et al. | 360/109 X |
| 3,787,616 | 1/1974 | Falk et al. | 360/75 X |
| 4,080,636 | 3/1978 | Ravizza | 360/77 |

FOREIGN PATENT DOCUMENTS

| 499919 | 4/1974 | Japan | 360/10 |
| 4984617 | 8/1974 | Japan. | |
| 373759 | 6/1973 | U.S.S.R. | 360/130 |

Primary Examiner—Bernard Konick
Assistant Examiner—Donald McElheny
Attorney, Agent, or Firm—Lewis H. Eslinger; Alvin Sinderbrand

[57] ABSTRACT

An automatic head scan tracking system for a video tape player includes a bi-morph leaf mounting a magnetic head on a drum rotatable for scanning the head across a magnetic tape having video signals recorded thereon in successive parallel tracks, the bi-morph leaf mounting the head for movement by a deflection signal applied thereto in either direction transverse to the direction of scan of the head across the tape, a generator of a sawtooth signal having a predetermined slope which, when applied to the bi-morph leaf, deflects the latter to cause the direction of the head scan across the tape to coincide with the direction of the recorded track, a circuit for producing timing signals indicating the rotational position of the magnetic head with respect to the beginning of a scan of the tape, and a circuit responsive to the timing signals and associated with the sawtooth signal generator for adjusting the starting point of the predetermined slope of the sawtooth signal so as to occur sufficiently in advance of the beginning of a scan of the tape by the magnetic head for dissipating any transient vibrations of the bi-morph leaf prior to the commencement of the scan.

10 Claims, 45 Drawing Figures

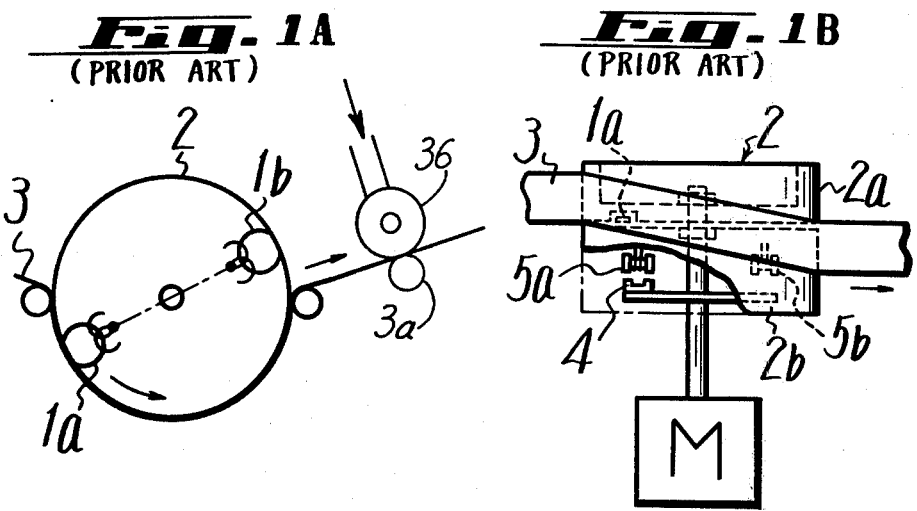
Fig. 1A (PRIOR ART)
Fig. 1B (PRIOR ART)
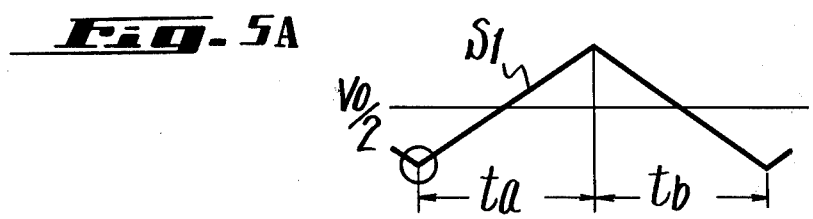
Fig. 5A
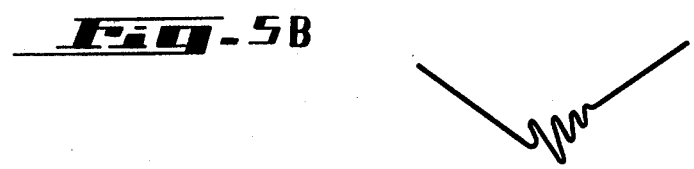
Fig. 5B

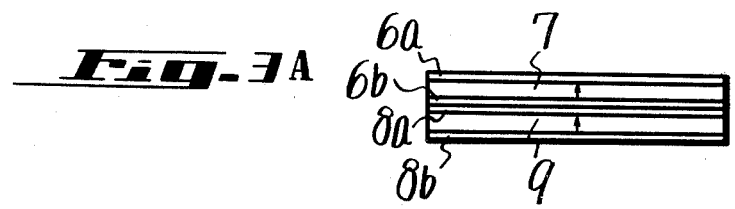
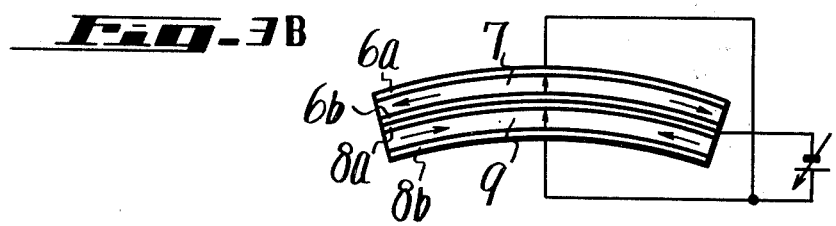
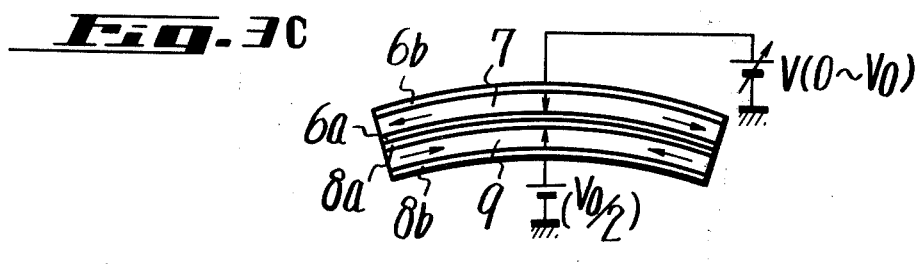
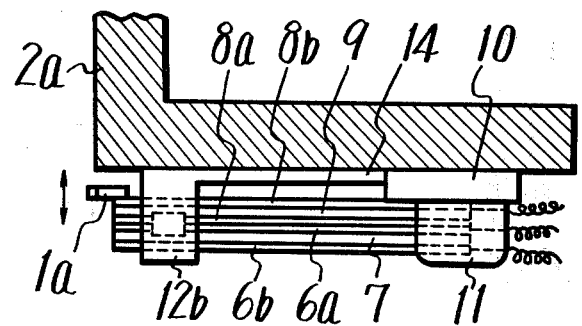
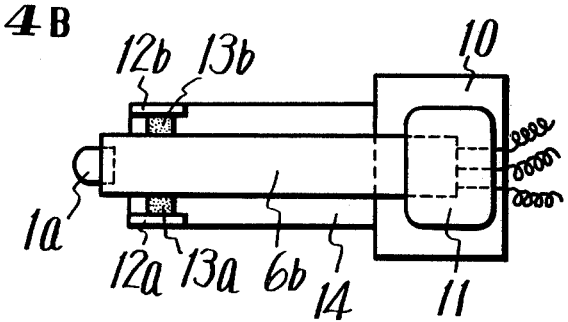

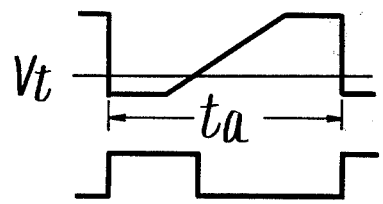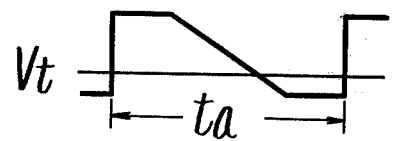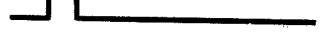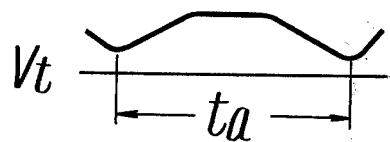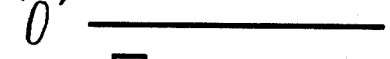

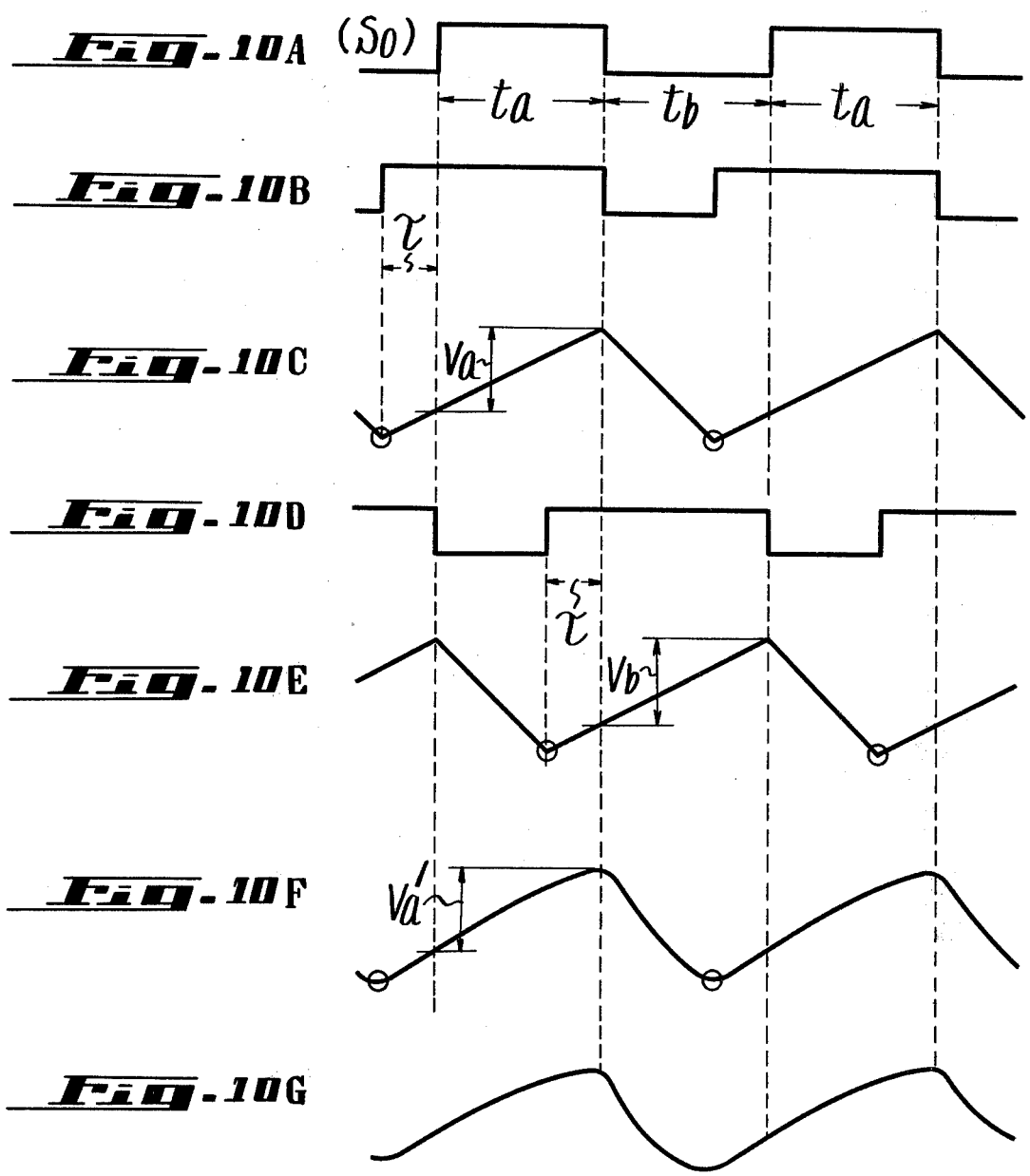

AUTOMATIC HEAD SCAN TRACKING SYSTEM

BACKGROUND OF THE INVENTION

1. Field of the Invention

This invention relates generally to an automatic head scan tracking system and is directed more particularly to an automatic head scanning system for improving signal reproduction at tape speeds which are different from the tape speed during signal recording.

2. Description of the Prior Art

In the use of video tape recorders, the situation often occurs where the magnetic tape speed during reproduction of a recorded signal is different from the speed that the signal was recorded at such as to achieve slow motion, still motion or quick motion picture reproduction. In order to carry out such reproduction at the different tape speeds and maintain picture quality, there has been proposed an automatic head scan tracking system having by a deflection device or deflector formed by an electro-mechanical transducer for performing a servo function to make the reproducing head accurately scan the recording track.

It is, known however that the deflector used in the above prior art system suffers from two defects. One defect is a transient vibration caused in the deflector when the deflector begins to move, which transient vibration deteriorates the reproduced picture. This first defect can be aboided some what by damping the deflector mechanically but it is difficult to eliminate the defect entirely. Also there is a possibility that the damping effect may be reduced by secular variation with the passage of time. The other defect, though depending upon the kind of deflector, is a hysteresis effect necessitating a closed loop servo in the tracking system with the result that the system becomes more complicated.

OBJECTS AND SUMMARY OF THE INVENTION

Accordingly, it is an object of the present invention to provide an automatic head scan tracking system for use with a video tape recorder.

It is another object of the present invention to provide an automatic head scan tracking system which is effective during signal reproduction at a tape speed different from that used during recording.

It is a further object of the invention to provide an automatic head scan tracking system by which the deterioration of a reproduced picture caused by transient vibration of the reproducing head deflector is avoided.

It is a still further object of the invention to provide an automatic head scan tracking system by which the deterioration of a reproduced picture caused by hysteresis of the displacement characteristic of a recording head deflector is avoided.

Accordingly, in an apparatus for reproducing video signals recorded in successive parallel tracks extending obliquely on a magnetic tape by means of a magnetic head mounted on a drum rotatable to scan said head across said tape; a head scan tracking system includes, bi-morph leaf means mounting said magnetic head on said drum for movement by a deflection signal applied thereto in either direction transverse to the direction of scan of said head across said tape, means for generating a sawtooth signal having a predetermined slope, means for applying said sawtooth signal to said bi-morph leaf means as said deflection signal to deflect said bi-morph leaf means in correspondence with said predetermined slope and thereby cause the direction of the head scan across said tape to coincide with the direction of a recorded track, positional signal generating means for producing timing signals indicating the rotational position of said magnetic head with respect to the beginning of a scan of said tape, and circuit means responsive to said timing signals and associated with said sawtooth signal generating means for adjusting the starting point of said predetermined slope of the sawtooth signal to occur sufficiently in advance of the beginning of a scan of said tape by said magnetic head to allow for any transient vibrations in said bi-morph leaf means at the beginning of said predetermined slope to dissipate prior to the commencement of a scan.

The other objects, features and advantages of the present invention will become apparent from the following description taken in conjunction with the accompanying drawings.

BRIEF DESCRIPTION OF THE DRAWINGS

FIG. 1A is a schematic top plan view of a rotary head drum assembly used in a two head helical scan type video tape recorder;

FIG. 1B is a partially exposed side view of the head drum assembly shown in FIG. 1;

FIG. 3A is a side view showing an example of a deflector for supporting a magnetic head;

FIG. 3B is a side view of the deflector shown in FIG. 3A with a voltage source used for explaining the operation thereof;

FIG. 3C is a side view of another example of the deflector with a voltage source;

FIG. 4A is a side view of the deflector shown in FIG. 3A supporting a magnetic head;

FIG. 4B is a plan view of the deflector shown in FIG. 4A;

FIG. 5A is a waveform of a drive voltage $S_1$ which is applied to the deflector of FIGS. 4A and 4B;

FIG. 5B is an enlargement of the part of the waveform shown in FIG. 5A;

FIGS. 7A to 9E are waveform diagrams for explaining the operation of the circuit shown in FIG. 6;

FIG. 10A through 10G, is a waveform diagram for explaining a manner of production of a sawtooth wave signal used in the circuit of FIG. 6;

DESCRIPTION OF THE PREFERRED EMBODIMENTS

Figure 2A:
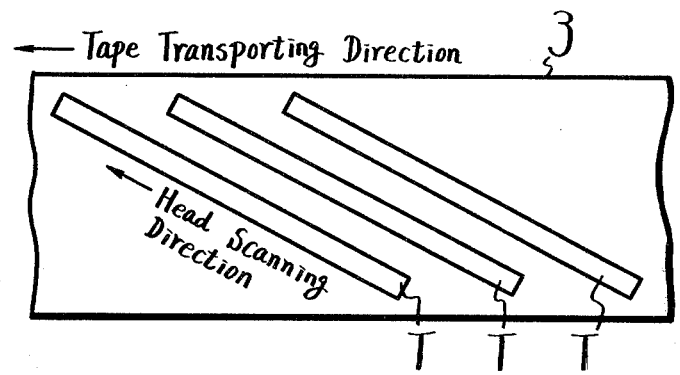
FIG. 2A is a diagram of a magnetic tape showing the slanted magnetic tracks formed thereon by the video tape recorder of FIGS. 1A and 1B.

First, the operation and defect of a video tape recorder hereinafter according to the prior art will be described with reference to FIG. 1 and FIG. 2.

In a rotary head drum assembly of a two head helical-scan VTR, as shown in FIG. 1A and FIG. 1B, two magnetic heads 1a and 1b are arranged diametrically to each other in a rotatable upper drum 2a of a tape guide drum 2. The tape guide drum 2 consists of the rotatable upper drum 2a and a stationary lower drum 2b. A magnetic tape 3 is wrapped on a slant around the tape guide drum 2 over an arc of about 180°, and is transported in the direction shown by the arrows on FIG. 1A and FIG. 1B. by a transport means including a driven capstan 3a and a pinch-roller 3b for urging the tape 3 thereagainst. The magnetic heads 1a and 1b are rotated in the direction shown by the arrow within the drum 2 in FIG. 1A at the rate of 30 revolutions per second by an electric motor M. Further, a magnet 4, rotating with the magnetic heads 1a and 1b, and stationary pick-up heads 5a and 5b are arranged in the tape guide drum 2. a position detecting pulse is generated from the pick-up heads 5a and 5b, indicating to the rotational positions of the magnetic heads 1a and 1b.

Figure 2B:
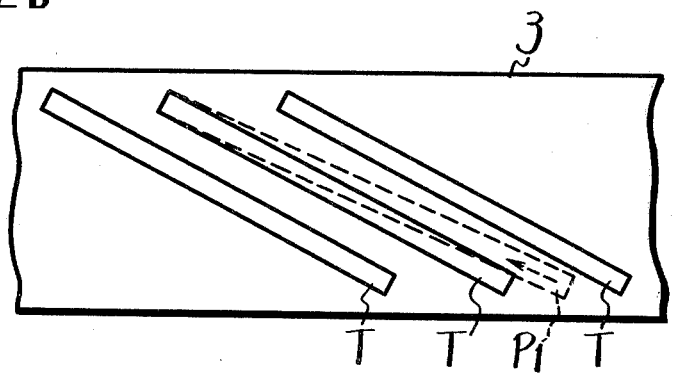
FIGS. 2B, 2C and 2D are views of the magnetic tape of FIG. 2A used for explaining still motion reproduction.
Figure 2C:
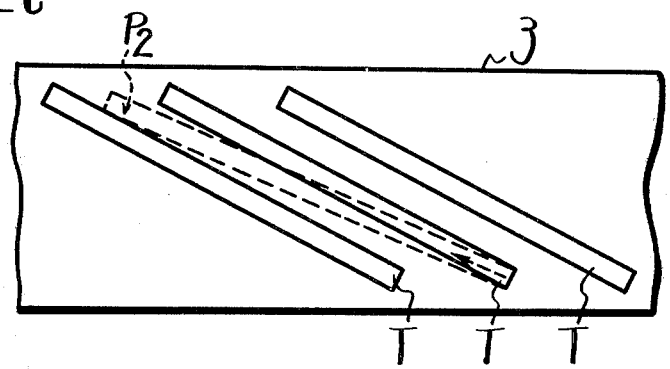
Figure 2D:
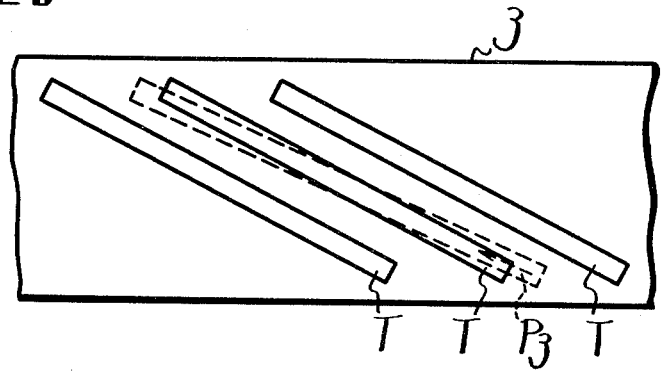

The track pattern on the magnetic tape 3 formed by the above type of VTR is shown in FIG. 2A. As shown in FIG. 2A, slanted tracks T, each containing one field of a video signal, are alternately formed on the magnetic tape 3 by the magnetic heads 1a and 1b. When reproducing signals recorded on the tape 3, the relative speed of the magnetic heads 1a and 1b to the magnetic tape 3 is selected to be equal to the relative speed during recording. A servo control is applied to the driving system of the heads 1a and 1b based upon the control signal (not shown) recorded on one edge portion of the tape 3 and the signals detected by the pick-up heads 5a and 5b so that the heads 1A and 1b scan the tracks T alternatively. In some cases, the tape speed used during reproduction is different from the tape speed used during recording. For example, slow motion picture reproduction is achieved at a tape speed of a fraction of the normal reproduction tape speed, a still (still picture) reproduction is achieved by stopping the transportation of the tape 3, and quick motion reproduction is achieved at a tape speed of several times the normal tape speed. If the tape speed is varied as described, the inclination of the reproducing traces of the heads 1a and 1b become different from that of the tracks T as shown. As an example, the relation between reproducing traces $P_1$, $P_2$ and $P_3$ and tracks T during still motion reproduction is shown in FIGS. 2B, 2C and 2D. When the transportation direction of the magnetic tape 3 and the scanning direction of the magnetic heads 1a and 1b are selected as shown in FIGS. 1 and 2, the reproduction traces of the magnetic heads during still notion reproduction mode are inclined from the tracks T by a constant inclination as shown in the figures. Depending upon where the tape 3 is stopped, any of the following cases, may occur. The initial portion of the reproducing trace $P_1$ may occur on a guard band (or an adjacent track) as shown in FIG. 2B and the end portion may coincide with the track T. Also, the initial portion of the reproducing trace $P_2$ may coincide with the track T as shown in FIG. 2C. Fastly, a portion near the center of the reproducing trace $P_3$ may be coincident with the track T as shown in FIG. 2D. In the respective cases shown in FIGs. 2B, 2C and 2D, the positions at which interference (caused by a guard band or a crosstalk from an adjacent track) appears on reproduced pictures are different. Track shift or displacement is not limited to still motion picture reproduction but also occurs during slow motion reproduction and quick motion reproduction.

To avoid track displacement caused by different tape speed being used during recording and reproduction a tracking correction apparatus is proposed which uss a movable magnetic head and includes an electromechanical transducer.

First, construction of the electro-mechanical transducer or deflector for displacing the rotary magnetic head will be described with reference to FIG. 3 and FIG. 4. An electro-mechanical transducer such as piezo-electric element, piezo-ceramic element or electro-magnetic element can be used as the deflector.

In this embodiment, the rotary magnetic head is supported by a piezo-electric element. A drive signal is supplied to the piezo electric element to correct the deviation of the scanning path of the magnetic head.

FIG. 3A shows one example of a bi-morph leaf as the piezo-electric element. The bi-morph leaf includes a pair of platelike piezo-electric materials 7 and 9. Electrodes 6a and 6b, and 8a and 8b are plated on both surfaces of the piezo-electric materials 7 and 9, respectively. The electrodes 6b and 8a contact with each other, so that the directions of the polarizations of the piezo-electric materials 7 and 9 are the same as each other, as shown by the arrows on FIG. 3A.

When an electric field is applied to the above-described bi-morph leaf in the manner shown on FIG. 3B, the piezo-electric matrerial 7 is elongated, while the piezo-electric material 9 is shortened, in the lengthwise directions as shown by the arrows on FIG. 3B. As the result, the bi-morph leaf bends as shown in FIG. 3B. The bending displacement depends on the strength of the applied electric field. When the reverse electric field is applied to the bi-morph leaf, the latter bends in the reverse direction.

FIG. 3C shows the bi-morph leaf when the electrode 6a contacts with the electrode 8a so that the direction of the polarization of the piezo-electric material 7 is opposite to the direction of the polarization of the piezo-electric material 9. No voltage is applied to the mated electrodes 6a and 8a, while a bias voltage $V_o/2$ is applied to the electrode 8b, and a variable (0 to $V_o$) drive voltage V is applied to the electrode 6b. When the drive voltage V is lower than the bias voltage $V_o/2$, the bi-morph leaf bends downwardly as shown on FIG. 3C. When the drive voltage V is higher than the bias voltage $V_o/2$, the bi-morph leaf bends upwardly.

FIG. 4A and FIG. 4B show a bi-morph leaf assembly supporting a magnetic head. As shown on FIG. 4A and FIG. 4B, a mounting base 10 is fixed to the lower surface of the upper head drum 2a. The base end of the bi-morph leaf is fixed to the mounting base 10 by adhesive 11. The leaf is so arranged that the surfaces of the piezo-electric materials 7 and 9 are parallel with the lower surface of the upper head drum 2a. The magnetic head 1a or 1b is attached to the free end of the leaf. The lengthwise direction of the air gap of the head 1a or 1b is perpendicular to the surfaces of the materials 7 and 9. And the surfaces of the materials 7 and 9 are substantially perpendicular to the rotational shaft of the upper head drum 2a.

Damper members 13a and 13b which may be made of rubber are provided for damping free oscillation due to the bending force applied to the piezo-electric leaf. The damper members 13a and 13b are attached to a pair of tabs 12a and 12b fixed to one end of a damper mounting plate 14 which is fixed to the lower surface of the upper head drum 2a. The damper mounting plate 14 extend toward the periphery of the upper head drum 2a from the outward side of the mounting base 10. The damper members 13a and 13b are pressed between the sides of the bi-morp leaf and the tabs 12a and 12b, respectively. Lead wires are connected to the electrodes of the bi-morph leaf. When a certain voltage is applied to the lead wires in the manner as shown on FIG. 3C, th bi-morph bends downwardly or upwardly to move the magnetic head 1a or 1b in a direction substantially perpendicular to the rotational orbit of the magnetic head 1a or 1b, as shown by the arrow on FIG. 4A.

With the magnetic heads 1a and 1b being movable by the bi-morph leaves as described above, the video signal is recorded on the magnetic tape to form the tracks T without drive and bias voltages being supplied to the bi-morph leaves. While, for example, a still reproduction mode, if the reproducing trace $P_3$ is made coincident with the track T at the center as shown in FIG. 2D and the bi-morph leaf is supplied with a drive voltage, in the form of a slant wave signal whose level is varied positively and negatively about the bias voltage in a period of one field, the reproducing trace can be made coincident with the record track T. Thusly, a still picture without interference due to track deviation can be reproduced.

FIG. 5A is a waveform of a drive voltage $S_1$ which may be used as the abovementioned slant wave signal and is applied, for example to the bi-morph leaf supporting the magnetic head 1a. As shown in FIG. 5A, the drive voltage $S_1$ increases at a constant rate about the bias voltage Vo/2 within the field $t_a$, during which a reproducing trace is formed by the head 1a, and decreases from above to below the bias voltage at the same constant rate within the next field $t_b$ during which the head 1b scans the magnetic tape. As a result, the bi-morph leaf is bent by the above drive voltage $S_1$ to correct the track displacement. However, at the beginning of the field $t_a$ the drive voltage $S_1$ is changed from the negative slop to the positive slop causing its level to change abruptly at this point the higher harmonic component contained in the drive voltage $S_1$ coincides with the inherent vibration frequency of the bi-morph leaf to cause resonance of the bi-morph leaf and a transient vibration therein. This transient vibration is caused when a drive voltage with an abrupt, as shown in FIG. 5B in an enlarged scale, is applied to the bi-morph leaf. Due to this transient vibration of the bi-morph leaf, the envelope of a reproduced output signal from the magnetic head 1a is disturbed. Since the chrominance signal component of a color video signal is amplitude-modulated, the transient vibration of the bi-morph leaf is especially damaging to the recording and reproducing of such signals.

Accordingly, the present invention is intended to remove the adverse affect caused by the abrupt level variation of the drive voltage to the bi-morph leaf.

An example of the automatic head scan tracking system of the present invention will be hereinafter described as applied to a rotary two head type VTR used for still motion reproduction.

Figure 6:
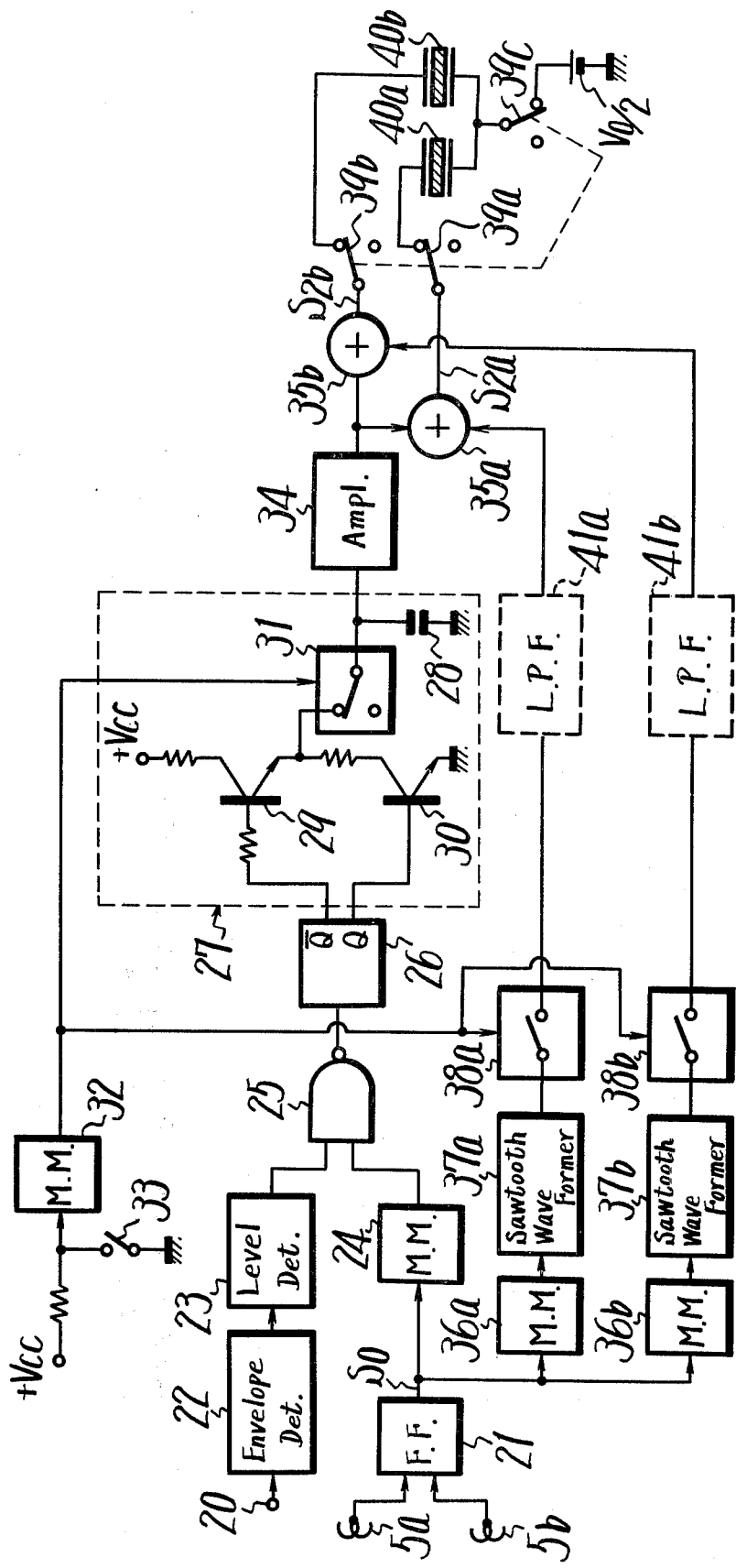
FIG. 6. is a block diagram of a circuit according to one embodiment of the present invention.

In FIG. 6, which is a block diagram showing an example of the invention adapted to a two rotary head type VTR, 20 designates an input terminal to which an RF video signal (FM modulated signal), which has been reproduced by the magnetic heads 1a and 1b and passed through a reproducing amplifier and a reproducing switching circuit (both not shown), is applied. In this case, if the VTR is a color VTR, an FM modulated luminance signal, which is produced by supplying the output from the reproducing head to a high pass filter to be separated thereby, is applied to the terminal 20. In FIG. 6, 21 designates a flip-flop which is triggered by position detecting pulses provided by passing the outputs from the pick-up heads 5a and 5b through an amplifier and a monostable multivibrator (which are not shown but will be hereinafter referred to as a mono-multi). This flip-flop 21 produces a head changing pulse $S_o$ which becomes high in level for the field $t_a$ and low in level for the field $t_b$. The RF video signal is fed from the terminal 20 to an envelope detector 22 whose output signal is fed to a level detector 23. This level detector 23 produces a detected output with a constant level when the envelope of the RF video signal becomes lower than a threshold level $V_t$. A NAND gate 25 is supplied with the output of level detector 23 and the output of a mono-multi 24 which is triggered by the head changing pulse $S_o$. The output of the NAND gate 25 is fed to a re-trigger type mono-multi 26 at its trigger terminal. The Q and Q outputs of the mono-multi 26 are fed to a hold circuit 27 indicated by a dotted line block in FIG. 6 to charge and discharge its capacitor 28. In detail, the Q and Q outputs of the mono-multi 26 are supplied to the bases of transistors 29 and 30, respectively. The collector of transistor 29 is connected to a power supply terminal of $+V_{cc}$, and the emitter thereof and the collector of transistor 30 are connected together through a resistor. The emitter of the latter is grounded, and the emitter of transistor 29 is connected through a switch circuit 31 to the capacitor 28 to form the hold circuit 27. The switch circuit 31 is changed to the state shown in FIG. 6 during the time interval in which a mono-multi 32 produces an output to connect the transistors 29 and 30 to the capacitor 28, but opened, or changed to a contact which is electrically open, when the mono-multi 32 produces no output. The mono-multi 32 is triggered by a switch 33 which is made ON for a still reproduction mode. The output DC voltage of the hold circuit 27 is fed to an amplifier 34 and the output of the latter is fed to an adder or mixer 35 including, in this case, adders or mixers 35a and 35b.

The head changing pulse $S_o$ which has a duty factor of 50% at the frequency of 30 Hz is applied to a mono-multi 36a whose output is applied to a sawtooth wave signal generator or former 37a which may include an integrator. Thus, a sawtooth wave signal, which increases during a period some what longer than one field $t_a$ during which the magnetic head 1a outputs a reproduced signal, and decreases during a period somewhat shorter than one field $t_b$ during which the next magnetic head 1b outputs a reproduced signal, is produced by the sawtooth wave generator 37a. The sawtooth wave signal thereof is applied through a gate circuit 38a to the mixer 35a and therein superimposed on the DC voltage from the amplifier 34. Thus, the mixer 35a produces a drive voltage $S_{2a}$. The gate circuit 38a is in the OFF-state as shown in FIG. 6 during the period of time when the mono-multi 32 produces an output and becomes ON when the output of the mono-multi 32 if off. The drive voltage $S_{2a}$ is applied through the reproducing contact of a recording and reproducing switch 39a to one electrode of the deflector or bi-morph leaf 40a which supports the magnetic head 1a. The other electrode of the bi-morph leaf 40a is supplied with a bias voltage Vo/2 through the reproducing contact of a recording and reproducing switch 39c. A drive voltage $S_{2b}$, which is applied to the deflector or bi-morph leaf 40b supporting the other magnetic head 1b, is provided in a manner similar to that of the drive voltage $S_{2a}$. The output of a mono-multi 36b, the input of which is supplied with the head changing pulse So, is fed to a sawtooth wave generator or former 37b, and the sawtooth wave signal produced from the generator 37b is applied through a gate circuit 38b to the mixer 35b to be superimposed on the DC voltage from the amplifier 34 to thereby produce the drive voltage $S_{2b}$. The drive voltages $S_{2a}$ and $S_{2b}$ are applied to the bi-morph leaves 40a and 40b through slip rings and may also be further amplified, if necessary.

With the above example of the invention, the center of the record track is made coincident with the center of the reproducing trace of the head in response to the level of the DC voltage from the amplifier 34 on which the sawtooth wave signal is superimposed. This will be described with reference to FIGS. 7 to 9.

FIG. 7A is a waveform diagram showing an envelope of an RF video signal produced by a magnetic head such as 1a following the reproducing trace $P_1$ shown in FIG. 2B. FIG. 7B is a waveform of the detected output produced by the level detector 23 when the level of the envelope is lower than the threshold level $V_t$, and FIG. 7C is a pulse produced by the mono-multi 24 at the beginning of the reproducing trace $P_1$. The detected output shown in FIG. 7B and the pulse shown in FIG. 7C are applied to the NAND gate 25 so that the NAND gate 25 produces an output shown in FIG. 7D. The mono-multi 26 is triggered by the output of the NAND gate 25 at its down-going edge and then produces a Q output which is "1" as shown in FIG. 7E. Thus, the transistor 30, which is supplied with the Q output or output "1", turns ON and hence the charge stored in the capacitor 28 is discharged therethrough. As a result, the DC voltage applied to the adders or mixers 35a and 35b from the amplifier 34 decreases. Thus, this DC voltage is lower than the bias voltage Vo/2 shown in FIG. 5A. The sawtooth wave signal is superimposed on this DC voltage, so that the displacement of bi-morph leaf 40a is maximum at the beginning of reproducing trace $P_1$ and is zero at the end of reproducing trace $P_1$. The time constant of mono-multi 26 is selected to be slightly longer than one frame period, so that if the NAND gate 25 produces an output of "0" again when the head changing pulse So is changed after one frame period, the mono-multi 26 is re-triggered.

In the case of reproducing trace $P_2$ shown in FIG. 2C, the envelope of an RF video signal reproduced therefrom is shown in FIG. 8A. In response thereto, the level detector 23 produces a detected output which becomes "1" in the later half of the field as shown in FIG. 8B. Thus, as the output of mono-multi 24 is as shown in FIG. 8C, the output of NAND gate 25 is unchanged as "1", FIG. 8D, and the mono-multi 26 is not triggered. Accordingly, the Q output of the mono-multi 26 is "0" as shown in FIG. 8E and its $\overline{Q}$ output is "1". As a result, the transistor 29 is made ON by this $\overline{Q}$ output and the capacitor 28 is charged. Thus, the DC voltage applied to the mixers 35a and 35b becomes more than the bias voltage Vo/2. Since the sawtooth wave signal is superimposed on the increased DC voltage, the bi-morph leaf 40a is displaced very little at the beginning of reproducing trace $P_2$ but is displaced at its maximum at the end of reproducing trace $P_2$.

Further, in the case of reproducing trace $P_3$ shown in FIG. 2D, the envelope of a reproduced RF video signal does not drop below the threshold level $V_t$ as shown in FIG. 9A and the output of level detector 23 remains at "0" as shown in FIG. 9B. As a result, the output of NAND gate 25 does not go down as shown in FIG. 9D and the mono-multi 26 is not triggered as shown in FIG. 9E. Thus, the capacitor 28 is charged. As may be apparent from the above description, that during a period of time from the stopping of one magnetic tape by making the still switch 33 ON to a certain time determined by the time constant of mono-multi 32, a DC voltage is produced which has a level to make the center of the reproducing trace $P_3$ coincident with the center of the track T as shown in FIG. 2D, and thereafter the gate circuits 38a and 38b are made ON by the output of mono-multi 32 to superimpose the sawtooth wave signals on the DC voltage provide the drive voltages $S_{2a}$ and $S_{2b}$ for the bi-morph leaves 40a and 40b, respectively.

The production of the sawtooth wave signal will be described with reference to FIG. 10. FIG. 10A is a waveform diagram showing the output So of flip-flop 21 which becomes "1" in the field $t_a$, during which the magnetic head 1a scans the magnetic tape 3, and "0" in the field $t_b$, during which the other magnetic head 1b scans the tape 3. As described previously, the head changing pulse $S_o$ is fed to the mono-multi 36a which then produces an output of logical "1" during a period longer than the field $t_a$ by $\tau$ in advance of the beginning of field $t_a$ and output of logical "0" during a period shorter than the field $t_b$ as shown in FIG. 10B. This pulse is fed to the sawtooth wave signal generator or former 37a which produces a as sawtooth wave signal shown in FIG. 10C. This sawtooth wave signal is superimposed on the DC voltage, from amplifier 34, in the mixer 35a to be the drive voltage $S_{2a}$. This drive voltage $S_{2a}$ is applied to the bi-morph leaf 40a. The mono-multi 36b, which is supplied with the head changing pulse $S_o$, produces an output of logical "1" during a period longer than the field $t_b$ by $\tau$ in advance of the beginning of the field $t_b$ and an output of logical "0" in a period shorter than the field $t_a$ as shown in FIG. 10D. The sawtooth wave signal generator or former 37b, which is supplied with the output of mono-multi 36b, produces a sawtooth wave signal as shown in FIG. 10E. This sawtooth wave signal is applied to the mixer 35b and is therein superimposed on the DC voltage from the amplifier 34. The combined signal becomes the drive voltage $S_{2b}$ which is applied to the bi-morph leaf 40b.

According to the invention described above, the points of the sawtooth wave signals at which their levels are changed abruptly (refer to the circled portions in FIGS. 10C and 10E) preceed the starting points of the fields $t_a$ and $t_b$ by the time period $\tau$. Thus, even if the bi-morph leaves 40a and 40b are resonated by the abrupt level changes, the transient vibrations caused thereby are attenuated within the period $\tau$. As a result, the level of the reproduced output is undisturbed.

The level variation $V_a$ of the sawtooth wave signal in the field $t_a$ shown in FIG. 10C and the level variation $V_b$ of the sawtooth wave signal in the field $t_b$ shown in FIG. 10E are used to displace the bi-morph leaves which will correct the constant difference between the inclinations of the track T and the reproducing traces for a still reproduction mode. For this reason, the variations Va and Vb are selected to satisfy Va = Vb.

As an optional feature, the sawtooth wave signals of sawtooth wave signal generators 37a and 37b may be supplied to low pass filters to make their abrupt level variations dull as shown in FIG. 10F. In this case, the level variation Va' of the sawtooth wave signal in the field $t_a$ may be selected to be slightly greater than that $V_a$ in consideration of the fact the level variation is lessened.

Figure 11:
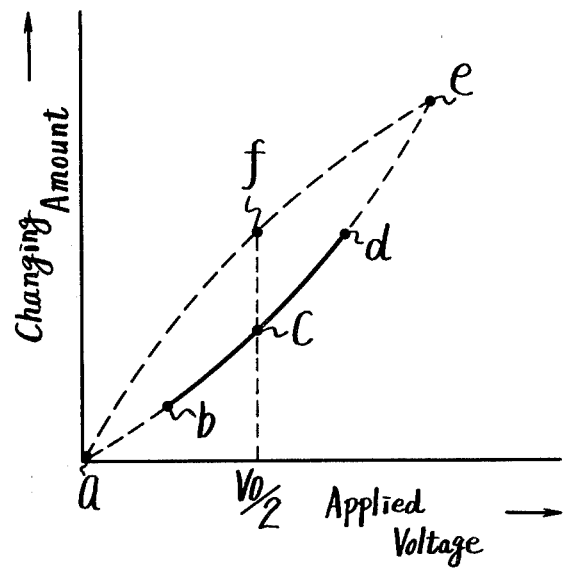
FIG. 11 is a graph showing the displacement to voltage characteristic of a deflector.

The above description is given on the asumption that the voltage to displacement characteristic of the deflector or bi-morph leaf is linear. However, the displacement characteristic of a deflector made of a piezo-electric or piezo-ceramic plate is not always linear. For example, variation of the displacement characteristic of a deflector of one of the above types is shown in FIG. 11 and also as is its associated hysteresis loss. When the level of the voltage applied to the deflector or bi-morph leaf is switched from that at point a to that at point e, the amount of the displacement increases from point a to point e through points b, c and d, which variation is non-linear as shown in FIG. 11. In turn, when the level of the applied voltage is switched off, the displacement amount decreases from a point e through point f to the point a, which variation is also non-linear and has a hysteresis different from the hysteresis of increasing the level of the applied voltage.

Accordingly, in the case that the bi-morph leaf is used in the range between the points b and d with the bias voltage Vo/2 as the center, the displacement amount is non-linear, and thus, the track deviation cannot be completely corrected.

In the above example, the automatic head scan tracking is carried out in such an extent with no problem in view of practical use. However in the case of a deflector with great non-linearity or in order to more accurately correct the displacement of tracking, it is necessary to provide a correcting circuit therefor.

As shown in FIG. 11, the voltage to displacement characteristic of the bi-morph leaf between the points b and d is a differentiation characteristics of the applied voltage. Accordingly, if integrator circuits are provided for the dotted line blocks 41a and 41b in FIG. 6, the outputs of the integrator circuits 41a and 41b are shown in FIG. 10G (which corresponds to a voltage applied to the head 1a) and thusly the above defect can be removed.

The above description concerns reproduction in a still picture mode, where the tape 3 is stopped; but the present invention can also be adapted to the reproduction of slow motion and fast motion pictures. By way of example, reproduction in a slow motion mode where the tape speed is ¼ of the speed used during recording will be described with reference to FIGS. 12 and 13 in which the parts corresponding to the above described example are marked with the corresponding numerals and their description is omitted.

In the ¼ speed slow motion reproduction mode, the scanning traces of heads 1a and 1b on the tape differ in inclination from those at the normal speed in a manner similar to the still motion reproduction mode. Accordingly, sawtooth wave signals are provided from sawtooth wave signal generators or formers 37a and 37b, and applied through the integrator circuits 41a, 41b, mixers 42a, 42b and output terminals 43a, 43b, to the bi-morph leaves 40a and 40b (not shown in FIG. 12) respectively. Thus, the scanning traces of heads 1a and 1b are mode to have the correct scanning angles. Since the peak value of the sawtooth wave signals used for slot motion reproduction are low as compared with those of the sawtooth wave signals in the still motion reproduction mode, the sawtooth wave signal generators 37a and 37b are adjusted to have lower peak values by slow motion reproduction switch. In addition the ¼ speed slow motion reproduction mode, it is necessary that the same track be scanned twice by each of the heads 1a and 1b. Therefore, it is required that the bimorph leaves 40a and 40b be supplied with drive voltages having a DC voltage of a predetermined value superimposed on the above sawtooth wave signals. The circuit for this purpose will be now described with reference to FIGS. 12 and 13.

Figure 12:
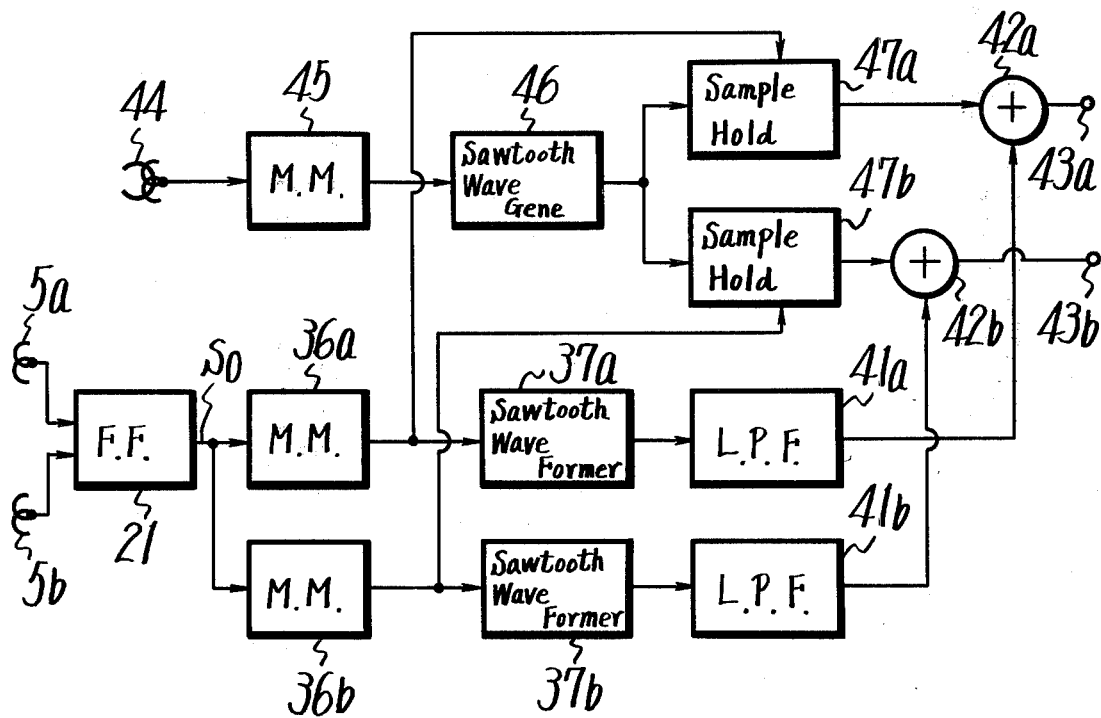
FIG. 12 is a block diagram of a circuit according to another embodiment of the present invention.
Figure 13A:
FIG. 13A through 13G, is a waveform diagram for explaining the operation of the circuit shown in FIG. 12.
Figure 13B:
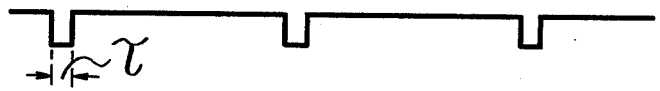
Figure 13C:
Figure 13D:
Figure 13E:
Figure 13F:
Figure 13G:

In FIG. 12, 44 designates a control track head which reproduces a CTL signal shown in FIG. 13A from the tape (not shown). This CTL signal is fed to a monomulti 45 which produces an output shown in FIG. 13B. The output of mono-multi 45 is fed to a sawtooth wave signal generator 46 in which the edge of the output of mono-multi 45 controls the going-up of the sawtooth wave signal from the generator 46. The frequency of this generator 46 is selected such that it is 4-field period (15 $H_z$ in the NTSC signal) and its rising-up is in advance of the CTL signal by $\tau$ as shown in FIG. 10. The sawtooth wave signal from the generator 46 is fed to sample hold circuits 47a and 47b and sampled therein by the outputs of mono-multis 36a and 36b, respectively. In this case, the sampling is carried out once every two cycles of the outputs of mono-multis 36a and 36b as shown in FIGS. 13D and 13E, respectively. The outputs from the sample hold circuits 47a and 47b (shown in FIGS. 13E and 13G) are fed to the adders or mixers 42a and 42b, respectively.

Since the sample held outputs also use the lead period $\tau$ as in the above example, the transient vibrations caused in the detectors or bi-morph leaves 40a and 40b at the variation of the sample held outputs do not bodly affect a reproduced signal.

In the above examples, although the present invention is described in connection with a VTR which includes two rotary magnetic heads, it is of course possible that this invention can be applied to a VTR which includes more than three rotary magnetic heads.

It will be apparent that many modifications and variations could be effected by one skilled in the art without departing from the spirits or scope of the novel concepts of the present invention, and the scope of the appended claims should interpreted accordingly.

I claim as my invention;

1. In an apparatus for reproducing video signals recorded on a magnetic tape in successive parallel tracks formed obliquely thereon including a magnetic head mounted on a drum rotatable to scan said head across said tape; a head scan tracking system comprising;
   bi-morph leaf means mounting said magnetic head on said drum for movement by a deflection signal applied thereto in either direction transverse to the direction of scan of said head across said tape;
   means for generating a sawtooth signal having a predetermined slope;
   means for applying said sawtooth signal to said bi-morph leaf means as said deflection signal to deflect said bi-morph leaf means in correspondence with said predetermined slope and thereby cause the direction of the head scan across said tape to coincide with the direction of a recorded track;
   positional signal generating means for producing timing signals indicating the rotational position of said magnetic head with respect to the beginning of a scan of said tape; and
   circuit means responsive to said timing signals and associated with said sawtooth signal generating means for adjusting the starting point of said predetermined slope to occur sufficiently in advance of the beginning of a scan of said tape by said magnetic head to allow for any transient vibrations in said bi-morph leaf means at the beginning of said predetermined slope to dissipate prior to said beginning of said scan.

2. An apparatus according to claim 1, wherein said positional signal generating means includes a flip-flop circuit having a rectangular wave output representing said timing signals, and said circuit means includes a mono-stable multivibrator adapted to be triggered by said rectangular wave.

3. An apparatus according to claim 1 further including tape transport means for moving said tape in its longitudinal direction past said drum at a predetermined speed and wherein said predetermined slope of said sawtooth signal is determined in response to said predetermined speed.

4. An apparatus according to claim 1; wherein said head scan tracking system further includes;
means for detecting the level of the signal produced by said magnetic head during a scan of said tape;
means responsive to said detecting means for generating a binary signal indicating whether the level of said detected signal is above or below a predetermined level; and
means responsive to said binary signal for generating a bias voltage for application to said bi-morph leaf means to compensate for positional misadjustment of said magnetic head with respect to a recorded track on said tape.

5. An apparatus according to claim 4, wherein said binary signal generating means is also responsive to said timing signals so as to cause said binary signal to occur during an initial portion of a scan.

6. An apparatus according to claim 4, wherein said means for generating a bias voltage includes a capacitor for storing said bias voltage, means for charging said capacitor when the scan of said head is mispositioned in one direction with respect to said recorded track and means for discharging said capacitor when the scan of said head is mispositioned in the other direction with respect to said recorded track.

7. An apparatus according to claim 6, wherein said system further comprises:
means for selecting a still motion reproduction mode of said apparatus;
timing and switching means responsive to said selecting means for interrupting the applying of said sawtooth signal to said bi-morph leaf means and for connecting said capacitor to said charging and discharging means for a predetermined initial period after the selection of said still reproduction mode to allow said bias voltage generating means to establish a bias voltage across said capacitor for adjusting the position of said bi-morph leaf means,
said timing and switching means being operative after said predetermined initial period to disconnect said capacitor from said charging and discharging means and to cause the application of said sawtooth wave to said bi-morph leaf.

8. An apparatus according to claim 1 wherein said means for applying the sawtooth signal includes low pass filter means for filtering out high frequency components from the point in said sawtooth signal at which slope change occurs.

9. An apparatus according to claim 1, wherein said means for applying the sawtooth signal includes integrator means to compensate for the hysteresis losses inherent in said bi-morph leaf means.

10. An apparatus according to claim 1, including transport means for moving said tape in its longitudinal direction past said drum, transducer means for detecting second timing signals recorded on said tape in predetermined relation to respective recorded tracks, second sawtooth generator means responsive to said second timing signals for generating a second sawtooth signal having a second predetermined slope the value of which corresponds to the speed of said tape past said drum, and means for applying said second sawtooth signal to said bi-morph leaf means for adjusting the position of said head in correspondence to said second predetermined slope.

* * * * *